Nov. 17, 1931.  W. D. LUTZ  1,832,312
SHAFT BEARING
Filed Dec. 15, 1928  2 Sheets-Sheet 1
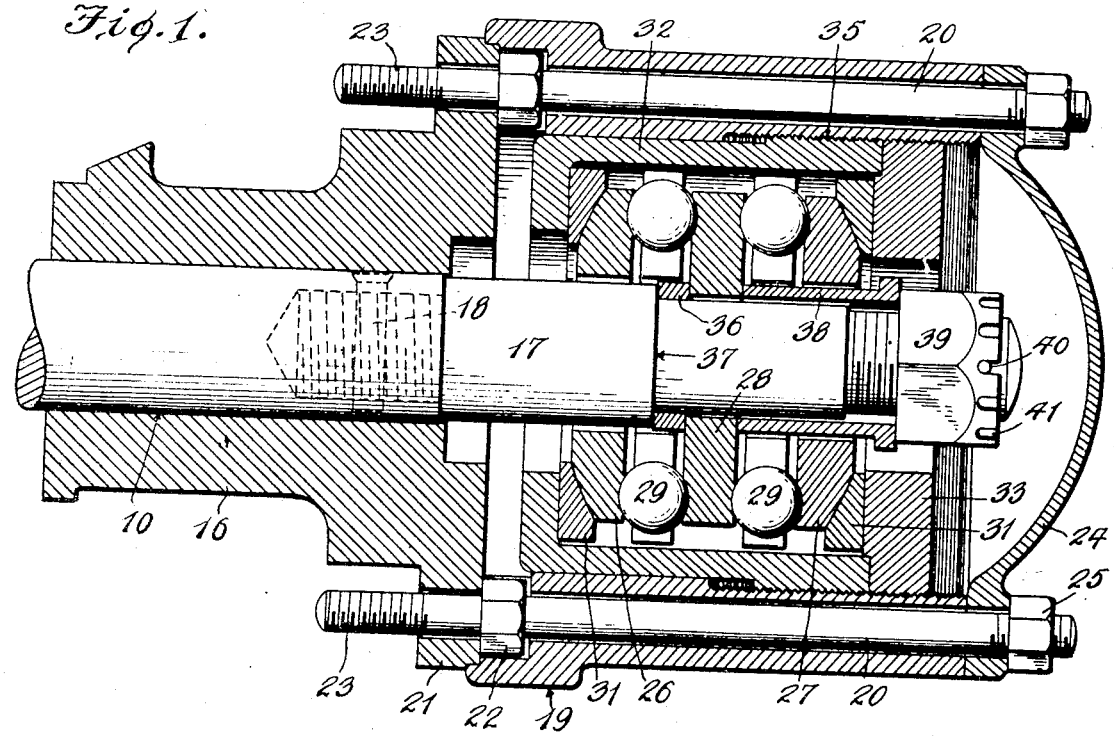
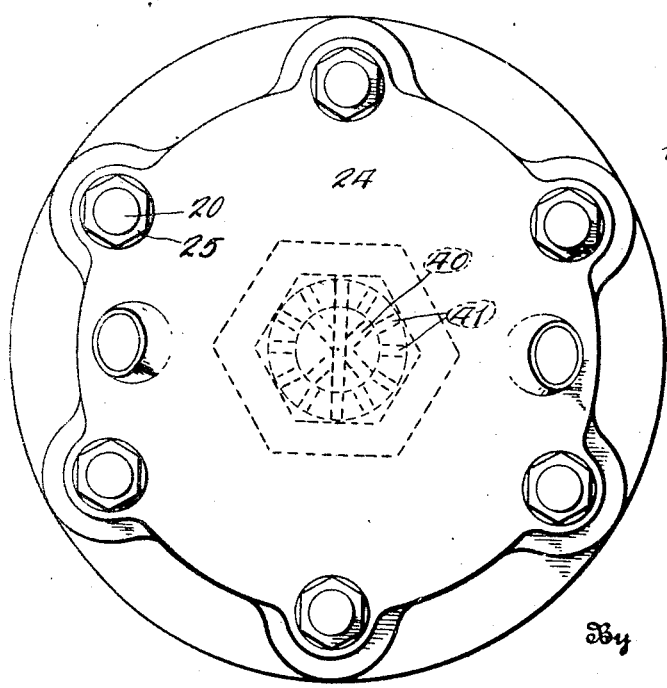
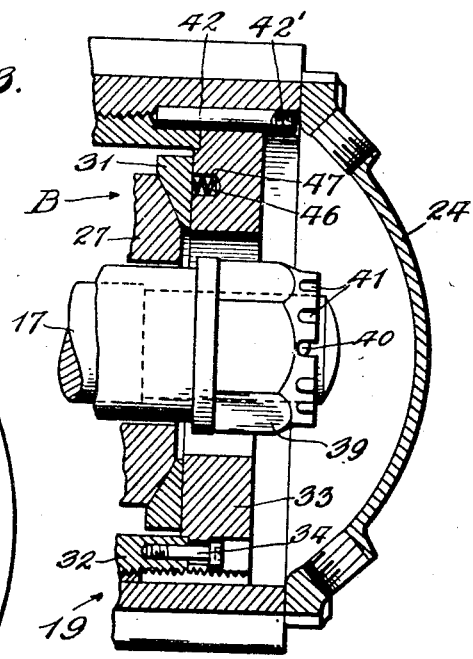
Inventor
William D. Lutz
By J. F. Rule
Attorney Nov. 17, 1931.  W. D. LUTZ  1,832,312
SHAFT BEARING
Filed Dec. 15, 1928   2 Sheets-Sheet 2

Inventor
William D. Lutz,
By J. F. Rule
Attorney

Patented Nov. 17, 1931

1,832,312

UNITED STATES PATENT OFFICE

WILLIAM D. LUTZ, OF ALLENDALE, NEW JERSEY; MABEL A. LUTZ ADMINISTRATRIX OF SAID WILLIAM D. LUTZ, DECEASED

SHAFT BEARING

Application filed December 15, 1928. Serial No. 326,353.

My invention relates to bearings for receiving the end thrust of a rotating shaft, and more particularly to such bearings in combination with a worm drive shaft having right and left hand worms driving a pair of worm gears which may intermesh or may be mounted on shafts carrying intermeshing gears. Gearing of this character is used in various situations and for various purposes. For example, it is in common use with electric elevators, and when so used the direction of rotation of the drive shaft is frequently reversed. Imperfect fitting of the gears when installed, or any subsequent wear, permits endwise movement of the shaft so that when the rate of speed is increased or decreased or the direction of rotation is reversed the shaft is given a sudden endwise movement through a corresponding distance. The pounding of the gears, jar or shock given to the elevator, and wear and strain thus placed on the mechanism, are serious objections which commonly result from this back-lash or play in the gears.

An object of the present invention is to overcome these objections by providing an improved form of bearing which will take the end thrust of the shaft in both directions and prevent endwise movement of the shaft in either direction. In this manner the usual pounding of the gearing is practically eliminated and a smooth operation is obtained.

Another object is to provide suitable adjusting means whereby the shaft may readily be adjusted endwise in either direction so that one sided wear of the worms and gears may be avoided.

A further object of the invention is to provide an improved bearing of the character indicated that may be readily added as an attachment to a worm gear shaft which has already been installed and used.

Other objects of the invention will appear hereinafter.

Referring to the accompanying drawings:

Fig. 1 is a sectional view of a bearing constructed in accordance with the principles of my invention.

Fig. 2 is an end elevation of the same.

Fig. 3 is a fragmentary sectional view showing the end portion of the shaft and bearing, the plane of the section being at an angle to that of Fig. 1.

Figure 4:
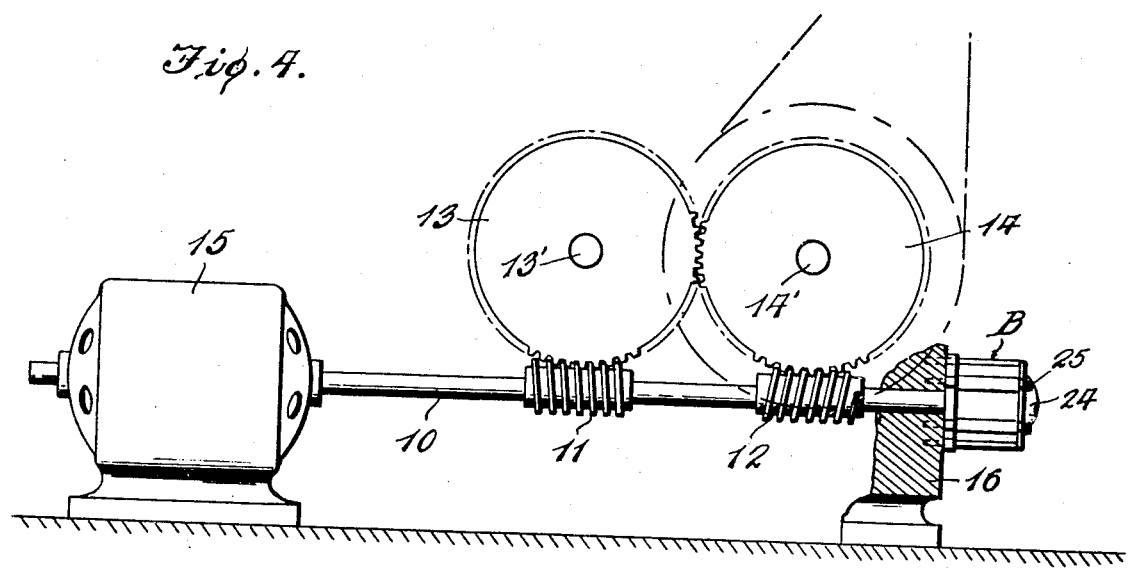
Fig. 4 is a partly diagrammatic view showing the worm shaft and gears.

Referring to Fig. 4, I have shown an arrangement of gearing commonly used for driving an elevator. This comprises a worm drive shaft 10 on which are secured worms 11 and 12 of opposite pitch, said worms meshing respectively with worm gears 13 and 14 keyed to shafts 13' and 14'. The gears 13 and 14 may intermesh with each other or, may be out of contact with each other and a driving connection between the shafts 13', 14' obtained by another pair or pairs of gears such as straight spur gears, spiral gears or herringbone gears. The shaft 10 is driven by an electric motor 15 which is reversible for driving the shaft in either direction.

As shown in Fig. 1, the shaft 10 is journalled to rotate in a bearing block 16 which may be of usual construction. The shaft is held against endwise movement in either direction, and the longitudinal thrust in both directions is taken up by my improved form of bearing B which will now be described.

The worm shaft 10 is herein shown as having attached thereto a stud shaft 17 forming an extension thereof and providing a convenient means for attaching my improved bearing to a worm shaft already installed without having been originally designed for such bearing. The same result can, of course, be obtained without the stud 17, by making the worm shaft longer in the first place. The end of the shaft 10 is drilled and tapped to receive the threaded end of the stud shaft 17 which is secured in place by any suitable means, as for example, a rivet 18.

The moving parts of the bearing B are enclosed in a casing 19. The outer end of the bearing 16 is machined to receive said casing.

Stud bolts 20 having heads 22, extend through openings in a flange 21 formed on the bearing 16 and have threaded ends to engage tapped holes in the worm gear casing. The heads 22 bear against the outer face of the flange. An end cover 24 is secured to the casing by nuts 25 threaded on the outer ends of the bolts 20. It will thus be seen that the bolts 20 serve to secure the thrust bearing unit to the bearing 16 and also to secure said parts to the gear casing.

Surrounding the stud shaft 17 is an inner thrust bearing plate or washer 26, an outer thrust bearing plate or washer 27 and an intermediate thrust bearing plate or washer 28. These bearing plates are spaced apart to receive bearing balls 29 which run in annular grooves formed in the faces of said plates. The bearing plates 26 and 27 are seated in cupped washers 31 which form ball and socket joints with the bearing plates, thereby precluding possible cramping due to imperfections in workmanship.

Figure 6:
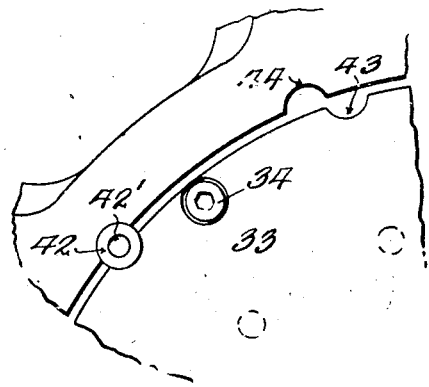
Fig. 6 is a fragmentary view on a larger scale, of parts shown in Fig. 5.
Figure 7:
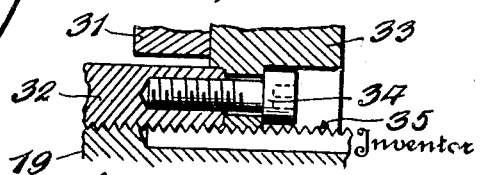
Fig. 7 is a sectional detail view showing means for securing an end plate or washer to the bearing case.

The entire ball bearing unit is enclosed in a steel shell 32, to the outer end of which an end plate or washer 33 is attached by means of screws 34 (Figs. 3, 6 and 7). The outer casing 19 has its inner surface machined, and screw threads 35 are formed on this surface, said threads extending from the outer end of the casing inward to a point intermediate the ends of the casing. The shell 32 fits closely within the unthreaded portion of the casing 19 but is free to rotate therein for purposes of adjustment. The peripheral surface of the end plate 33 and the adjoining surface of the shell 32 are screw threaded to fit the threaded portion 35 of the outer casing. By having the end plate 33 threaded to form a continuation of the threaded part of the shell 32, the whole fitting into the threaded casing, the screws 34 are not required to withstand the pressure which is taken by the thrust bearing. The construction just described permits the ball bearing to be adjusted as a unit in a direction lengthwise of the shaft, by rotating the shell 32 within the casing 19.

A loose collar 36 is mounted on the stud shaft 17 between the bearing plate 28 and a shoulder 37 formed on the shaft by reducing the diameter of the shaft for a portion of its length. A sleeve 38 is mounted on the stud shaft and bears against the plate 28 on the side opposite the collar 36. A nut 39 threaded on the end of the shaft, clamps the sleeve 38, plate 28 and collar 36 in position on the shaft.

The purpose of the collar 36 is to increase the range of adjustment of the ball bearing unit in respect to the worm shaft, since by placing this collar on one side or the other of the bearing plate 28 the position of the shaft in relation to the ball bearing may be changed an extent equal to the thickness of said collar. If desired, the collar 36 may be dispensed with entirely, in which event the sleeve 38 will press the bearing plate 28 against the shoulder 37.

It will be seen that with the nut 39 screwed home, the plate 28 will be rigidly attached to the worm shaft through the stud shaft 17, so that the worm shaft can move lengthwise only as permitted by the thrust bearing. Holes 40 drilled at different angles through the stud shaft, in combination with slots 41 in the nut 39, permit the nut to be locked to the shaft by means of a cotter pin (not shown).

The shell 32 is locked in its adjusted position within the outer case 19 by means of a pin 42 fitted into semicylindrical recesses 43 formed in the end plate 33 and shell 32, and recesses 44 formed in the casing 19. An annular series of these recesses 44 are provided in the shell 32 and spaced at equal intervals. A corresponding annular series of recesses 44 are formed in the casing 19 and also spaced at equal intervals. One of said series comprises one more recess than the other. This permits a minute adjustment as a pair of recesses 43 and 44 can be brought into register by rotation of the shell through a very small angle from any position. The locking pin 42 has a threaded hole 42' tapped into the outer end to permit a screw to be inserted to assist in withdrawing the pin.

When the pin 42 is withdrawn, the shell 32 can be rotated to adjust it in either direction within the outer casing 19, thereby adjusting the worm shaft in the same direction, as the thrust bearings do not permit any appreciable relative longitudinal movement of the shaft and shell. After the desired adjustment, the pin 42 is replaced, thereby locking the shell 32 and positively preventing endwise movement of the worm shaft in either direction. End play of the shaft or "back-lash" which takes place with the usual constructions when the direction of rotation is reversed, and particularly when the gears have become worn, is positively prevented in the present construction.

Figure 5:
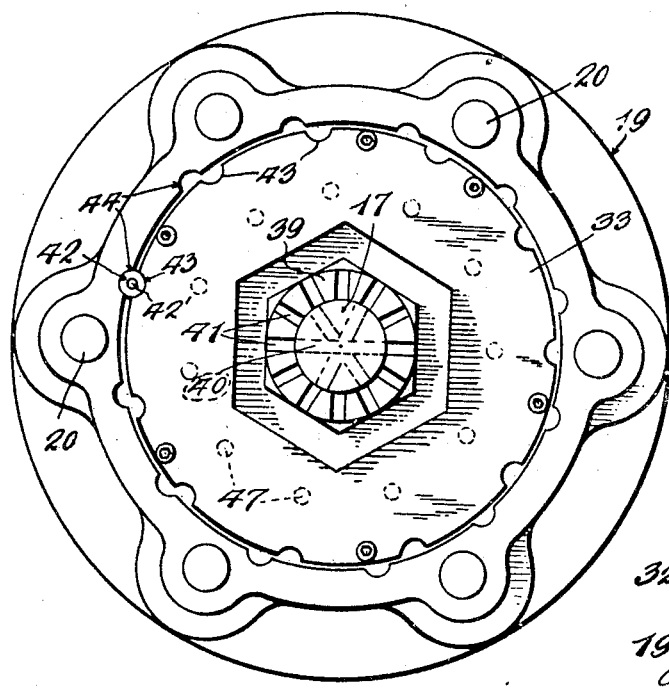
Fig. 5 is an end view of the bearing with the cover removed.

Small spiral springs 46 (Fig. 3) are seated in an annular series of recesses 47 (Fig. 5) in the inner face of the end plate 33 and in the inner end of the shell 32. These springs bear against the adjoining washers 31. The purpose of these springs is to hold the washers 31 in correct alignment with the end washers 26 and 27 respectively, in the event of there being a slight clearance between the end plate 33 or the inner end of the shell 32 and the adjacent washer 31. Assuming such a clearance, without the use of the springs 46 one of the washers 31 would be free to drop to a position eccentric to the drive shaft when the thrust is taken by the other washer 31, thus destroying the alignment of the ball and socket joint. The springs being spaced at short intervals around the inside of the ball bearing shell, at each end, serve to keep the concave and convex surfaces always in contact and thus prevent either washer from dropping out of alignment in the event of any clearance as above noted.

Modifications may be resorted to within the spirit and scope of my invention.

What I claim is:

1. The combination of a rotary shaft, end thrust bearings therefor comprising bearing plates, a shell enclosing said bearing plates, a casing in which said shell is mounted, said casing being internally screw threaded and said shell having external screw threads to engage the threads in the casing, whereby the shell is adjustable lengthwise in the casing, and means for locking the shell within the casing at any one of a plurality of rotative positions within the casing, said means including a locking pin, an annular series of recesses being formed in the inner wall of the casing and an annular series of recesses formed in the outer wall of the shell, the recesses of one of said series being spaced apart at angular distances slightly greater than the angular distance between adjacent recesses of the other series, whereby only a slight rotation of the shell from any position is required to bring a recess of one series into register with a recess of the other series for receiving the locking pin.

2. The combination with a shaft and a bearing in which the shaft is journalled to rotate, of an attachment for said shaft and bearing comprising means to prevent endwise movement of the shaft, said attachment including a stud shaft made in a separate piece from and secured to the end of said first mentioned shaft and forming an extension thereof, a casing surrounding the stud shaft and secured to said bearing, and anti-friction bearings within said casing arranged to take the endwise thrust of the shaft.

3. The combination with a shaft and a bearing in which the shaft is journalled to rotate, of an attachment for said shaft and bearing comprising means to prevent endwise movement of the shaft, said attachment including a stud shaft made in a separate piece from and secured to the end of said first mentioned shaft and forming an extension thereof, a casing surrounding the stud shaft and secured to said bearing, a central bearing plate mounted on the stud shaft within the casing, means for holding said bearing plate against endwise movement on the stud shaft, end bearing plates within the casing on opposite sides of said central plate, and bearing balls interposed between said central plate and said end plates respectively.

4. The combination of a rotary shaft, end thrust bearings therefor including a bearing plate or washer surrounding the shaft and rotatable therewith, a stationary support in which the bearings are mounted and by which the position of the bearings in a direction lengthwise of the shaft is determined, and means rotating with the shaft and holding said bearing plate in a fixed position relative to the shaft, said means being adjustable to shift the relative position of the bearing plate and shaft in a direction lengthwise of the shaft and thereby shift the shaft lengthwise of the thrust bearings and their support.

5. The combination of a rotary shaft, end thrust bearings therefor including spaced bearing plates or washers surrounding the shaft and bearing balls between said plates, a shell enclosing said plates, a stationary casing in which the shell is mounted and adjustable in a direction lengthwise of the shaft for adjusting the shaft in the direction of its length, the shaft having an end portion of reduced diameter thereby forming a stop shoulder, a collar mounted on said end portion of the shaft between said shoulder and one of said bearing plates, and means for holding the bearing plate against the collar and clamping the collar against said shoulder, said collar and plate being transposable to bring the plate directly against the stop shoulder, thereby increasing the range of adjustment of the shaft.

6. The combination of a main rotating shaft, a stud shaft made in a separate piece from the main shaft and secured thereto as an attachment and forming an extension thereof, end thrust bearings for the shaft comprising an intermediate bearing plate mounted on the stud shaft, end bearing plates surrounding the shaft and spaced from said intermediate plate, and bearing balls interposed between the plates, the openings through the said end bearing plates being of somewhat larger diameter than the shaft to provide clearance whereby the bearing can center itself and run true with the exact axis of rotation of the shaft irrespective of any eccentricity of the stud shaft.

7. The combination of a main rotating shaft, a stud shaft made in a separate piece from the main shaft and secured thereto as an attachment and forming an extension thereof, end thrust bearings for the shaft comprising an intermediate bearing plate mounted on the stud shaft, end bearing plates surrounding the shaft and spaced from said intermediate plate, bearing balls interposed between the plates, the openings through the said end bearing plates being of somewhat larger diameter than the shaft to provide clearance whereby the bearing can center itself and run true with the exact axis of rotation of the shaft irrespective of any eccentricity of the stud shaft, a shell or casing enclosing the bearing plates, and washers interposed between the inner end faces of said shell and said end plates, said washers having concave bearing surfaces and said end plates having convex bearing surfaces to engage said concave surfaces.

Signed at New York, N. Y., this 30th day of November, 1928.

WILLIAM D. LUTZ.